(12) United States Patent
Brederveld et al.

(10) Patent No.: US 8,532,005 B2
(45) Date of Patent: Sep. 10, 2013

(54) END NODE AND NETWORK COORDINATOR USING A CSMA BASED PROTOCOL

(75) Inventors: Loeke Brederveld, Meerkerk (NL); Bram Hugo Bert Van Den Bosch, Berchem (BE); Bart Magda Alex Jonkers, Hoevenen (BE); Adriaan Kamerman, Nieuwegein (NL); Stephan Johann Noel, Brussels (BE); Cornelis Adrianus Marinus Steenbergen, Bilthoven (NL)

(73) Assignee: Greenpeak Technologies B.V. (NL)

( * ) Notice: Subject to any disclaimer, the term of this patent is extended or adjusted under 35 U.S.C. 154(b) by 266 days.

(21) Appl. No.: 12/999,996

(22) PCT Filed: Jun. 23, 2008

(86) PCT No.: PCT/NL2008/050413
§ 371 (c)(1),
(2), (4) Date: Feb. 11, 2011

(87) PCT Pub. No.: WO2009/157758
PCT Pub. Date: Dec. 30, 2009

(65) Prior Publication Data
US 2012/0008626 A1 Jan. 12, 2012

(51) Int. Cl.
*G08C 17/00* (2006.01)
*H04L 12/413* (2006.01)
(52) U.S. Cl.
USPC .......................................... 370/311; 370/445
(58) Field of Classification Search
USPC ................ 370/278, 282, 311, 392, 445, 448
See application file for complete search history.

(56) References Cited

U.S. PATENT DOCUMENTS

| | | | |
|---|---|---|---|
| 6,192,230 B1 * | 2/2001 | van Bokhorst et al. | 455/343.3 |
| RE40,032 E * | 1/2008 | van Bokhorst et al. | 455/343.2 |
| 7,412,265 B2 * | 8/2008 | Chen et al. | 455/574 |
| 7,496,059 B2 * | 2/2009 | Yoon | 370/311 |
| 7,522,563 B2 * | 4/2009 | Rhee | 370/338 |
| 7,814,354 B2 * | 10/2010 | Tran et al. | 713/324 |

(Continued)

FOREIGN PATENT DOCUMENTS

| | | |
|---|---|---|
| EP | 1473881 | 11/2004 |
| WO | WO 0113227 | 2/2001 |

OTHER PUBLICATIONS

Jurca, et al., Joint Synchronization, Routing and Energy Saving in CSMA/CA Multi-Hop Hybrid Networkds, IEEE, Oct. 2004, pp. 245-254 (10 pages).

*Primary Examiner* — Hong Cho
(74) *Attorney, Agent, or Firm* — Fliesler Meyer LLP

(57) ABSTRACT

A communication protocol based on CSMA between a node, in particular an electronic label, and a network coordinator is disclosed. The node comprises:—a transceiver provided for communication with a network coordinator, wherein the transceiver handles a transmission channel based on CSMA;—a processing unit provided for processing data received via the transmission channel and displaying the data on a display unit. The electronic label is arranged to perform:—sending recurrently a data request packet;—going to a low power mode after sending the data request packet; and—waking-up for receiving a data response packet a predefined time interval after beginning sending the data request packet. The network coordinator is arranged to transmit the data response packet the predefined time interval after receiving the beginning of the data request packet. The invention provides a protocol based on CSMA with very low power operation in which a multitude of end nodes could receive from a network coordinator their corresponding data.

19 Claims, 6 Drawing Sheets

(56) References Cited

U.S. PATENT DOCUMENTS

| | | |
|---|---|---|
| 7,974,250 B2 * | 7/2011 | Jang et al. .................... 370/338 |
| 8,027,282 B2 * | 9/2011 | Boehnke et al. .............. 370/311 |
| 2003/0105983 A1 | 6/2003 | Brakmo et al. |
| 2004/0223506 A1 * | 11/2004 | Sato .............................. 370/428 |
| 2004/0253996 A1 * | 12/2004 | Chen et al. .................... 455/574 |
| 2005/0117530 A1 * | 6/2005 | Abraham et al. ............. 370/310 |
| 2007/0082714 A1 * | 4/2007 | Beach et al. .................. 455/574 |

* cited by examiner

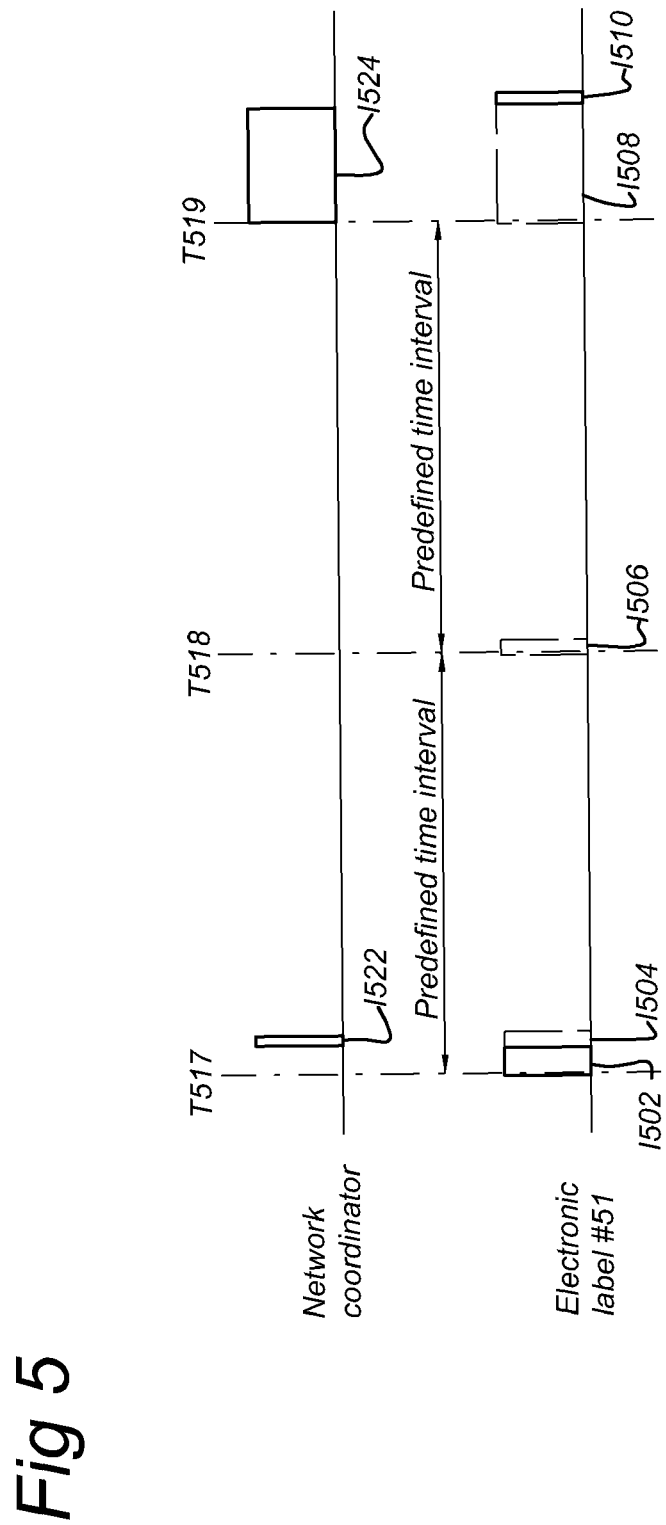

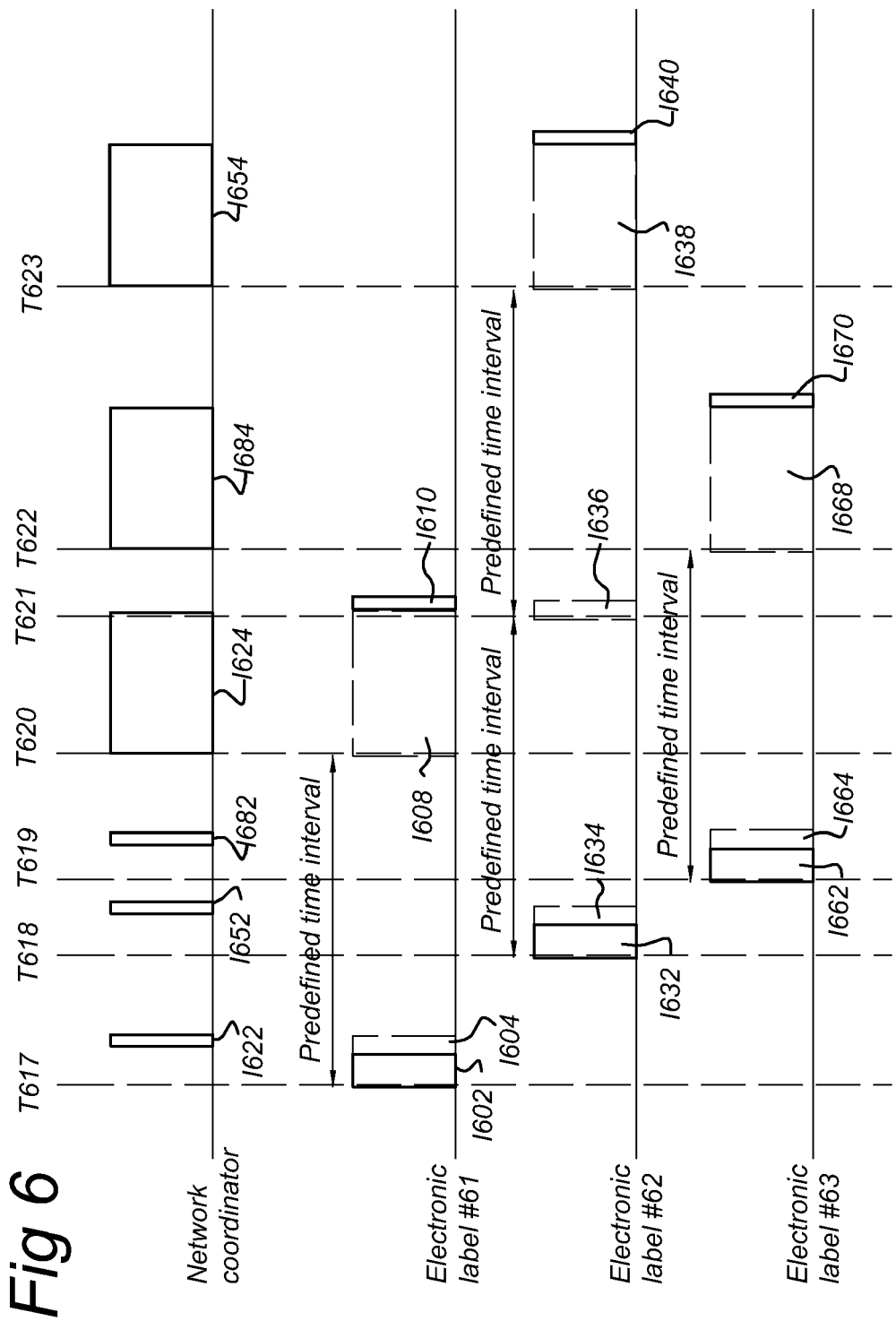

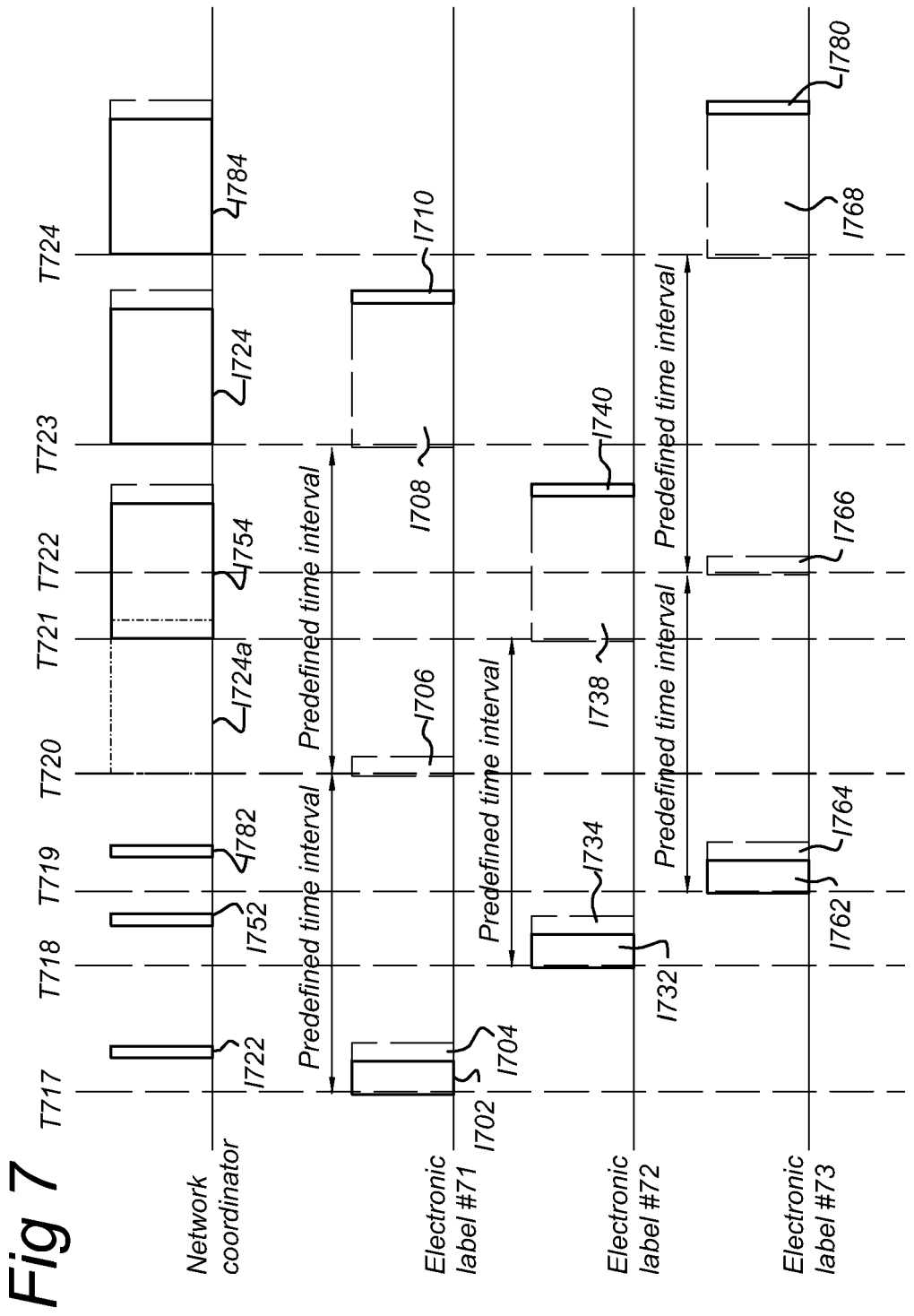

END NODE AND NETWORK COORDINATOR USING A CSMA BASED PROTOCOL

FIELD OF THE INVENTION

The present invention relates to network components for use in network comprising a multitude of end nodes and a limited number of network coordinators. More specifically, the invention relates to a wireless electronic shelf label (ESL) network. In a further aspect the invention relates to a communication protocol and a scheduler that are used in a wireless ESL network with a large number of electronic labels and at least one network coordinator.

Both the end node devices and network coordinators comprise a transceiver provided for communication with a network coordinator, wherein the transceiver handles a transmission channel based on CSMA and a processing unit provided for processing data received via the transmission channel and performing the corresponding actions.

The invention has particular application in a wireless infrastructure employing wireless communication devices with limited power resources in which power consumption of the devices is an issue. ZigBee, Bluetooth and IEEE 802.11 ("WiFi") are examples of wireless protocols that could be used.

BACKGROUND OF THE INVENTION

ESL systems consist of a large number of electronic labels, one for each merchandise item and a central server, together forming an ESL network. An electronic label displays the price and other information like name and/or price per kg of the corresponding the merchandise item. The central server has all the information for the electronic labels and has to communicate the information to be displayed to the corresponding electronic labels.

An ESL system is known from U.S. Pat. No. 6,108,367. The disclosed system is based on RF communication and batteries. Further, an ESL system is known from U.S. Pat. No. 6,715,676 which is based on infrared communication and the usage of solar cells and/or batteries.

EP1818864 discloses an ESL system making it possible to display for each commercial item the total inventory quantity indicating the number of commercial items that are not placed on the commercial item shelf but exist in the store as inventory.

With prior art ESL systems the network coordinator communicates to the electronic labels through a wireless link. Further, the network coordinator has a (wired or wireless) connection to a point-of-sale (POS) system that includes a POS terminal and a POS server with a database. The network coordinator can send from time to time a request to the POS system with respect to an updated price or a non-update status for a certain electronic label. Then, the POS system will send a reply to the network coordinator and in case of price update the update information will be forwarded to the electronic label in question.

When the network coordinator communicates to the POS system access has to be made to the POS database to find possible new price information for an electronic label in question. Different activities by the network coordinator and the POS system and the communication over the connection between the network coordinator and POS system, result in an unknown delay.

Energy harvesting with amorphous silicon solar cells allows power generation of around 3 $\mu W/cm^2$ with an indoor light intensity level of 100 lux. By stacking such solar cells a supply current of several $\mu A$ can be realized easily to store energy and creating a voltage of a few Volt with a cell area of several $cm^2$ under certain typical indoor light conditions.

Nowadays LCD (liquid crystal display) techniques allow low cost small-size displays with low power consumption, in particular when the displayed information stays unchanged.

With ZigBee based designs for radio and networking, the functionality for an ESL network can be realized. ZigBee solutions are built around 2.4 GHz, "Wireless Medium Access, Control (MAC) and Physical Layer (PHY) Specifications for Low-Rate Wireless Personal Area Networks (LR-WPANs)". Such 2.4 GHz radio designs are optimized for a minimum chip-area, a high integration level and minimum off-chip components to realize robust communication in the worldwide available 2.4 GHz band. These ZigBee solutions further attempt to limit the activity of the microprocessor and 2.4 GHz radio by sleep and standby modes. The power consumption can be reduced by turning off circuitry during certain time intervals. Further general background information can be found on www.zigbee.org.

The ZigBee application and network characteristics are described and built on top of the IEEE 802.15.4 radio MAC and PHY layers. The 802.15.4 MAC handles the radio channel medium access based on CSMA-CA (carrier sense multiple access with collision avoidance). ZigBee networks allow three network topologies: star, tree and mesh; and two operational modes: beaconed and non beaconed.

Non-beaconing is supported by star, tree and mesh networks. Here, an end-device is permanently allowed to access the medium and to send a message over the medium. A "parent" device can only send to an end-device an acknowledgement frame immediately after an end-device's data frame or a reply data frame after an end-device's data-request. Therefore, an end-device has self-control on its activity and takes the initiative to wake-up and to transmit a data frame (and to anticipate on a reply data frame), thus its activity allows event driven operation. Events which evoke transmission activity by the end-device can be initiated by an external trigger (like an alarm) but also by some external timer to take care of 'alive' traffic that is monitored at a central point. Since the end-device will initiate activity, it can stay in sleep mode until the next trigger occurs and a long period of inactivity can expire till the next 'alive' traffic trigger event. Therefore, such end-devices in non-beaconed devices enable a very low power operation and allow powering by an energy harvesting provision. However, with non-beaconing the coordinator and router have to be accessible permanently and consequently the receiver circuitry in a coordinator or router should be powered permanently.

In the 1970's several MAC protocols were developed for wireless networks. In the book J. L. Hammond, P. J. P. O'Reilly, Performance analysis of local computer networks, Addison-Wesley, 1986, ISBN 0-201-11530-1 (pp. 279-346) such protocols developed for both radio networks and wired networks are summarized. This publication refers also to various kinds of CSMA protocols and points to the network performance parameters such as normalized propagation delay (=contention window/packet transmission time) which is crucial to derive the throughput for a given load situation (which are often characterized by the normalized load=probability of packet arrival during a time interval equal to the packet transmission duration). One of these protocols is non-persistent CSMA at which station with a frame to transmit will sense the channel. If found busy, the station does not transmit.

The CSMA-CA protocol is designed to reduce the collision probability between multiple stations accessing the medium at the point in time where collisions would most likely occur. Collisions are most likely to happen just after the medium becomes free, following a busy medium. This is because multiple stations would have been waiting for the medium to become available again. Therefore, a random backoff arrangement is used to resolve medium contention conflicts. The collision avoidance portion of CSMA-CA is performed through a random backoff procedure based on binary exponential backoff algorithm. A station with a frame to transmit will compute a random backoff time before it senses the channel. If found busy, the station computes again a random backoff time. The random time is based on random number of slot times.

In the 1990's CSMA-CA was adopted as MAC protocol within IEEE 802.11 for wireless LANs.

IEEE 802.15.4 for wireless Personal Area Networks (PAN) adopted the CSMA-CA protocol. A station that has something to transmit, operates according a certain flow-diagram in the 802.15.4 standard and applies parameters as: macMinBE, macMaxBE, macMaxCSMABackoff, aMaxFrameRetries. IEEE 802.15.4 applies a slot time based on the time check if the medium is free and the receive-transmit turn around time.

Various aspects of the MAC functionality have been published related to the optimization of the random wait and to power management with respect to beacon based sleep modes. Some publications on the 802.15.4 MAC describe network performance aspects in various ways like by dynamic adaptation of parameters as macMinBE.

SUMMARY OF THE INVENTION

It is an object of the invention to provide an ESL system that is based on a type of existing radio design appropriate for very low power operation with the electronic labels by minimum on-time for the radio transceiver and processor. Furthermore, it is an object of the invention to allow a power supply provision for the electronic labels with energy harvesting from indoor light with small-size solar cells. Furthermore, it is an object of the invention to use a type of standardized networking with an addressing capability for many thousands of devices (end nodes). Moreover, it is an object of the invention to use communication protocol provisions that lead to robustness, flexible start-up behavior, self-recovery and graceful degradation in relation to radio interference, varied load conditions and changing light intensity levels for the various electronic labels.

The present invention seeks to provide an improved communication protocol and scheduling method for use in a network configuration having characteristics as an ESL network. When implemented in an end node device, the end node device according to the invention comprises a transceiver provided for communication with a network coordinator, wherein the transceiver handles a transmission channel based on CSMA;

a processing unit provided for processing data received via the transmission channel;

wherein the end node device is arranged to perform:

sending recurrently a data request packet;

going to a low power mode after sending the data request packet; and waking-up for receiving a data response packet a predefined time interval after beginning sending the data request packet.

When implemented in a network coordinator, the network coordinator is arranged to perform:

receiving a data request packet sent by an end node device;

preparing a data response packet comprising data to be transmitted to the end node device;

transmitting the data response packet a predefined time interval after receiving the beginning of the data request packet.

The invention is based on the recognition that the end node has limited power resources. The time period the transceiver and processor of an end node are active should be limited as much as possible. After the end node has sent a data request packet, the network coordinator needs some time to retrieve the necessary data from a central database before the network coordinator can forward the data in a data response packet. The length of the waiting time is undefined, as the coordinator does not know in advance which of the end nodes is requesting data. If the request and response packet have to be sent contiguous via the transmission channel, during the time period needed by the network coordinator to retrieve the data, the end node has to listen to the channel during this time period. This results in unnecessary power consumption. Furthermore, the network coordinator has to occupy the transmission medium in this period, resulting in inefficient use of the transmission channel. To overcome unnecessary power consumption and waste of transmission channel capacity, a protocol is defined in both the end node and network coordinator using a predefined time interval between the transmission of the data request packet and the transmission of the data response packet. Having a predefined time interval longer than the sum of the time period required for sending a data request packet and the time needed by the coordinator to fetch the corresponding data, allows the end node to go to low power mode after sending the data request packet and to wake up a small time period before the data response packet will be sent by the network coordinator. This reduces the power needed by the end node to request and receive new data. Furthermore, directly after transmitting the data request packet, the transmission channel will be available for other devices to sent data, which increases the transmission channel capacity.

In an embodiment of the invention, the end node device comprises a network address and the data packets comprises a destination address. The end node device is further arranged to deriving the destination address from a data packet, to go in lower power mode when the destination address differs from the network address and to wake-up for receiving the data request packet at regular time instants, wherein the interval between the regular time instants corresponds to the predefined time interval. In this embodiment, the network coordinator is further arranged to perform recurrently: checking for an acknowledge packet transmitted by the electronics label immediately after transmitting the data response packet. If the acknowledge packet is not detected, transmitting again the data response packet the predefined time interval after beginning sending the previous data response packet. These features of the protocol allows the end node device to receive a data response packet with minimal power consumption if the time window in which the data response packet is expected, is used by other devices and the network coordinator to transmit the data response packet recurrently until the receipt of data response packet is acknowledged by the end node device.

In an embodiment of the invention, the end node device comprises a power supply unit comprising an energy storage and a solar cell and a sensor for determining the energy status of the energy storage. The end node device is further arranged to perform transmitting a data request packet comprising one or more parameters indicating the energy status of the electronic label. In this embodiment, the network coordinator is arranged to retrieve from the data request packet with a parameter indicating the energy status of the electronic label and to operate accordingly. In an embodiment, the parameter indicates the number of defined time instants the electronic label will look for the data response packet after transmitting the data request packet and the network coordinator is arranged to transmit the data response packet recurrently according the parameter if an acknowledge packet is not received from the electronic label. In another embodiment the parameter indicates one of two or more energy capacity regions of the energy storage and/or electric charge current of the energy storage. These features allow the network system to limit the number of trials to transmit the data response packet wherein the number of trials is related to the energy status of the end node device. No trials will be made when it could be expected that the end node does not have sufficient power to receive the data response packet. In this way, the transmission channel will not be occupied unnecessarily. The parameter indicating the electric charge current could further be used in the system to determine the lighting conditions of the respective nodes, and to address maintenance instructions or service calls.

In an embodiment of the invention, the data request packet comprises a time interval parameter indicating the duration of the predefined time interval and is the network coordinator arranged to transmit the data response packet said predefined time interval after receiving the beginning of the data request packet. This feature allows the system to improve the random distribution of transmittal of data packets over the transmission channel.

In an embodiment of the invention, the time interval between two subsequent transmissions of a data request packet is at least y times the predefined time interval. In an embodiment, y is an integer greater than 4. Increasing the value of y ensures that an end node will not request to frequently data from the network coordinator. Parameter y defines the shortest time between two changes in the data for a particular end node in the central database that could still be handled by the network system.

In a further embodiment of the invention, the time interval for transmitting a next data request packet depends on the moment of receiving a data response packet. This features enables the system to extend the time interval between two data request packets. This shortens the overall period needed to provide all end nodes with their corresponding data when starting up the network system. At start-up, switching on the light in a department store or supermarket, all end nodes have to request for their data. This will initially result in collisions, which make the period for updating all end node devices longer. By extending the time interval for retransmitting a data request packet after reception of the corresponding data in one or more subsequent data response packets, the end node device will not occupy the transmission channel for a longer period enabling other end node devices to receive their corresponding data.

SHORT DESCRIPTION OF DRAWINGS

The present invention will be discussed in more detail below, using a number of exemplary embodiments, with reference to the attached drawings, in which FIG. 1 illustrates an ESL network;

Figure 4:
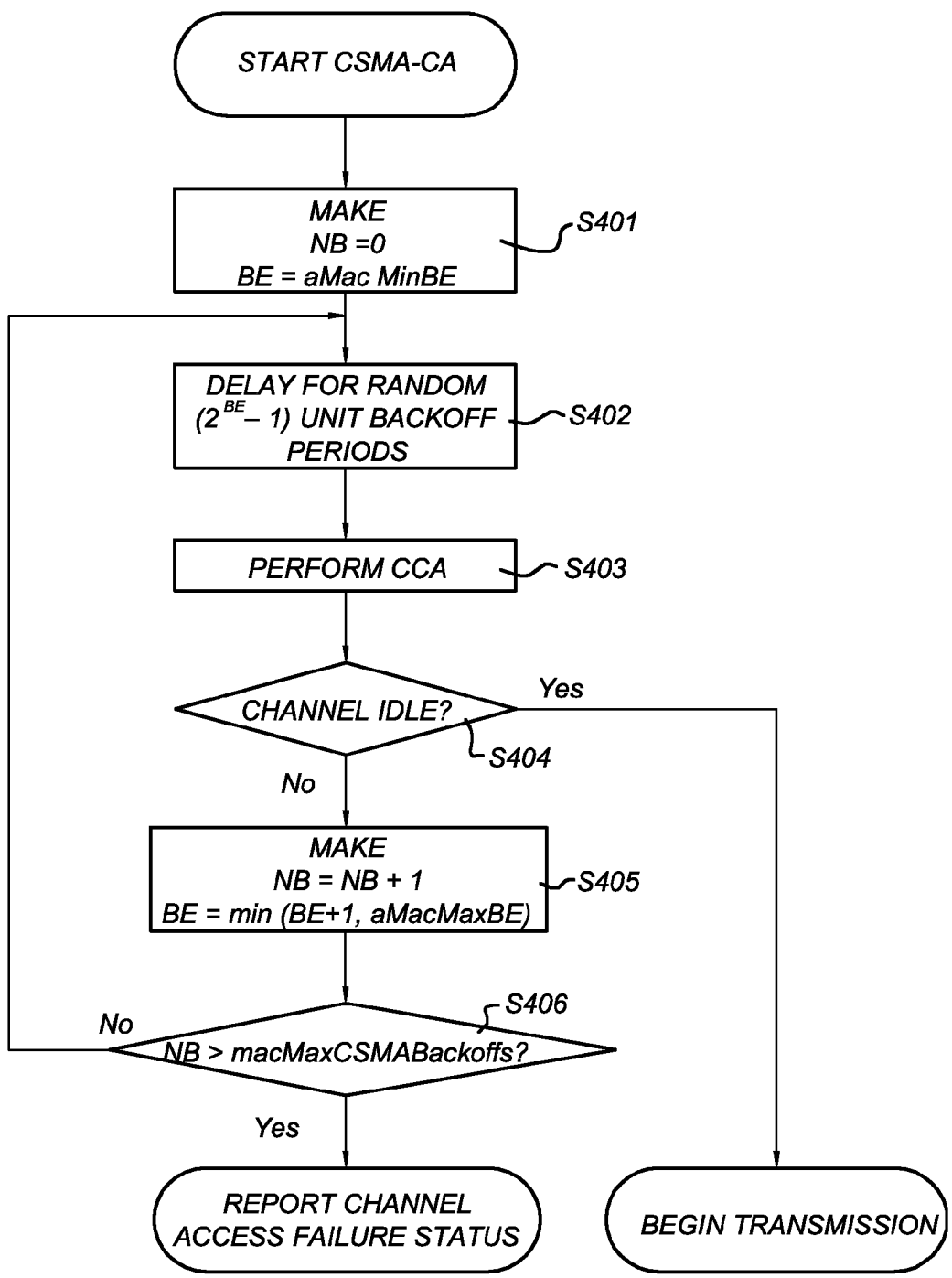

FIG. 4 gives a flow chart for CSMA-CA medium access with IEEE 802.15.4 non-beaconed networks;

FIG. 5 shows an example of timing for transmissions between an electronic label and the network coordinator;

FIG. 6 shows an example of timing for transmissions between a number of electronic labels and the network coordinator; and, FIG. 7 shows an example of timing for transmissions between a number of electronic labels and the network coordinator with different priorities for transmission towards the electronic labels.

DETAILED DESCRIPTION OF EXEMPLARY EMBODIMENTS

Figure 1:
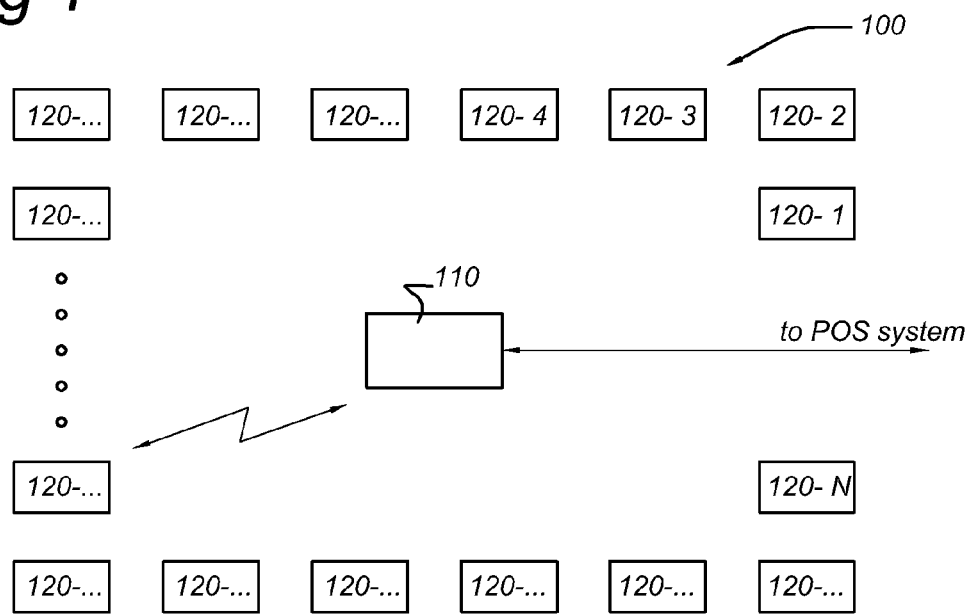

FIG. 1 illustrates an ESL system 100 according to the invention. The ESL system comprises a network coordinator 110, a point-of-sale (POS) system and a multitude of electronic shelf labels 120-1, 120-2, . . . 120-N. The network coordinator 110 communicates through a wireless link with the electronic labels 120-1, 120-2, . . . 120-N. The network coordinator has a (wired or wireless) connection to a POS system that includes a POS terminal and a POS server with a database. The POS system sends in case of new price data for an electronic label this information to the network coordinator. The network coordinator stores this information and will forward it to the electronic label in question at a later moment.

According to the invention, an electronic label 120- sends a data request packet to the network coordinator to check if new price data is available at the network coordinator from the POS system. In response to the data request packet, the network coordinator forwards a data response packet that contains price update information or an non-update status for the electronic label in question. According to the invention, the electronic label 120- will define the moment in time that it will be awake to listen to the network coordinator that may start transmitting the data response packet at that moment. The timing of the data response packet transmission has to prevent long waiting by the electronic label in active mode to receive something. Therefore, the network coordinator schedules the transmission of the data response packet after a predefined time interval to avoid unknown delays by various activities, such as retrieving the data to be acquired from a central database comprising the data for each of the multitude of electronic labels. When the network coordinator has successfully completed the transmission of the data response packet to the electronic label, it will send a packet to the POS system to confirm the forwarding of the price update information to the electronic label in question. This approach of forwarding and storing the price update information and keep record of the outstanding price updates by the network coordinator relaxes the occupancy of the link between the POS system and the network coordinator.

To provide maximum sleep time for the transceiver and processor of the electronic label, these two have to be turned on only around the period the electronic label will send a data request packet and right in time to receive one or more data response packets from the network coordinator that is addressed to the electronic labels in question. Further, the transceiver and processor have to be turned off as much as possible. By taking this into account, the invention provides a communication protocol and scheduling approach supporting a power supply provision for the electronic label with a number of stacked solar cell elements and a storage capacitor.

This storage capacitor buffers sufficient energy to let the electronic label become active for some short period once in a while to send a data request packet and to receive a data response packet. The stacked solar cell elements should under worse specified lighting conditions harvest sufficient energy to supply a display unit of the electronic label and to charge the storage capacitor for transmission of a subsequent request for update information and receipt of the corresponding update information.

The network coordinator is always turned on to allow receive and transmit activity from and to the electronic labels. Therefore, the network coordinator needs a provision to get power all the time, for example from a mains power or an energy harvesting technology which provides enough energy for such an operation.

Both network coordinator 110 and electronic labels 120-1 through 120-N include a transceiver based on IEEE 802.15.4. The invention is not limited to IEEE 802.15.4. but can be used in any CSMA based transmission protocol.

Figure 2:
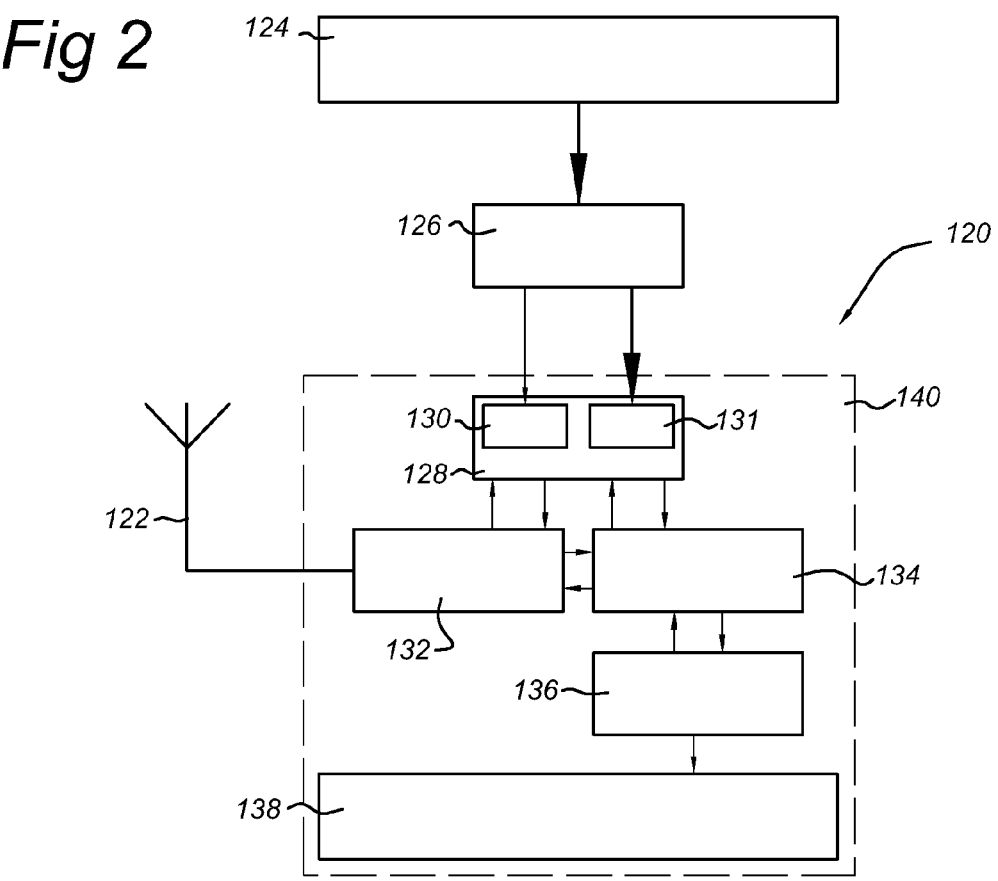
FIG. 2 shows a detailed block diagram of an electronic label (having a solar cell, a radio with an antenna, a processor and a display)

FIG. 2 shows a detailed block diagram of an electronic label 120 having a solar cell 124, a transceiver 132 with one or more antennae 122, a processor 134 and a display 138. The solar cell block 124 comprises a number of stacked solar cells that generate an electric current in presence of sunlight or light generated by lamps such as incandescent lamps, arc lamps, LED lamps, fluorescent lamps and gas-discharge lamps. This electric current is fed to the energy storage 126 and the magnitude of the current depends on the light intensity that is falling on the solar cells 124. The current that is fed to energy storage 126, is used to charge a capacitor inside energy storage 126, which has an over-voltage protection unit that limits the voltage to for example 3.6 V over the capacitor. Furthermore, energy storage 126 has a circuit that forwards in case the voltage has reached a level of 3.1 V a trigger signal to a power supply manager 128. More precisely this trigger signal goes to the event timer 130 inside the power supply manager 128. The energy storage 126 supplies a voltage and current to power supply manager 128 that distributes power over all blocks (128 through 138) inside global block 140. The power supply manager 128 is arranged to turn on and off the radio transceiver 132 and processor 134. The radio transceiver 132 is connected to one or more antennae 122. Processor 134 communicates to a display driver 136, while this display driver 136 controls a display 138. Further, in some embodiments as will be described below in this document the power supply manager 128 contains in addition a sensor unit 131 that determines after a request from processor 134 the energy status of the energy storage. In an embodiment, the energy status is a value that corresponds to one voltage range that is selected out of a few voltage ranges covering the whole voltage range of the energy storage 126. This voltage range information can be used by processor 134 as indication for the available buffered energy as described for an embodiment with energy based prioritization, that will be described below. In another embodiment, the sensor unit 131 determines the electric current towards the energy storage. The electric current could be used to estimate the energy that could be harvested in a coming time period and to estimate whether this will be sufficient to receive a data response packet. In an embodiment, the sensor unit 131 is arranged to measure both the voltage across the energy storage and the current fed to the energy storage 126.

When there is a certain light intensity level, the energy storage will be charged and the voltage supplied by energy storage block will be sufficient high after a few minutes to power the various blocks within 140 to operate for a while. Then, the electronic label 120 can set up a communication with the network coordinator. For this purpose, an event timer 130 will provide a wake-up command for the power supply manager after the trigger from the energy storage block in relation to the exceed of 3.3 V and expiring a previously stored timer value based on a random interval within 3 through 5 minutes.

Then, processor 134 and radio transceiver 132 will be turned on by power supply manager 128. Processor 134 and radio transceiver 132 will take care for sending a data request packet with respect to a potential price update to the network coordinator. In case the price information is stored in volatile memory, a request for sending the price information will be sent every time after switching on the light. Processor 134 prepares the generation of the data request packet at application level. After the radio transceiver 132 has sent this packet and the acknowledge packet has been received, event timer 130 will be configured for a wake-up signal to be generated right in-time to wake-up the transceiver 132 and processor 134 to receive the expected data response packet sent by the network coordinator.

Furthermore, as long as the electronic label 120 comprises enough energy to communication with the network coordinator 110, the electronic label will transmit a data request packet regularly after a time interval which corresponds to the minimum time period between two subsequent changes in price for an electronic label. Reasonable time intervals are 1, 5, 10, 15, 30, 60 minutes or any other time interval in the range 1-60 minutes. When an electronic label receives new or updated price information, the next update is not expected within said time interval of several minutes. However, if the electronic label receives a data response packet indicating that no price update information is available, new price update information could be made available within said period of several minutes. In that case, the electronic label will transmit more frequently a data request packet, which will be up to the moment a price update will be made available. In this case the time between two subsequent transmissions of a data request packet is at least y times the predefined time interval. In an embodiment, y is an integer greater than 4. In an embodiment, the time period between two subsequent transmissions of a data request packet is greater than the maximum expected delay, which is a function of the predefined time interval, between transmission of the data request packet and the data response packet. In an preferred embodiment, the value of y corresponds to a repetition time for sending a data request packet of 1 minute.

Figure 3:
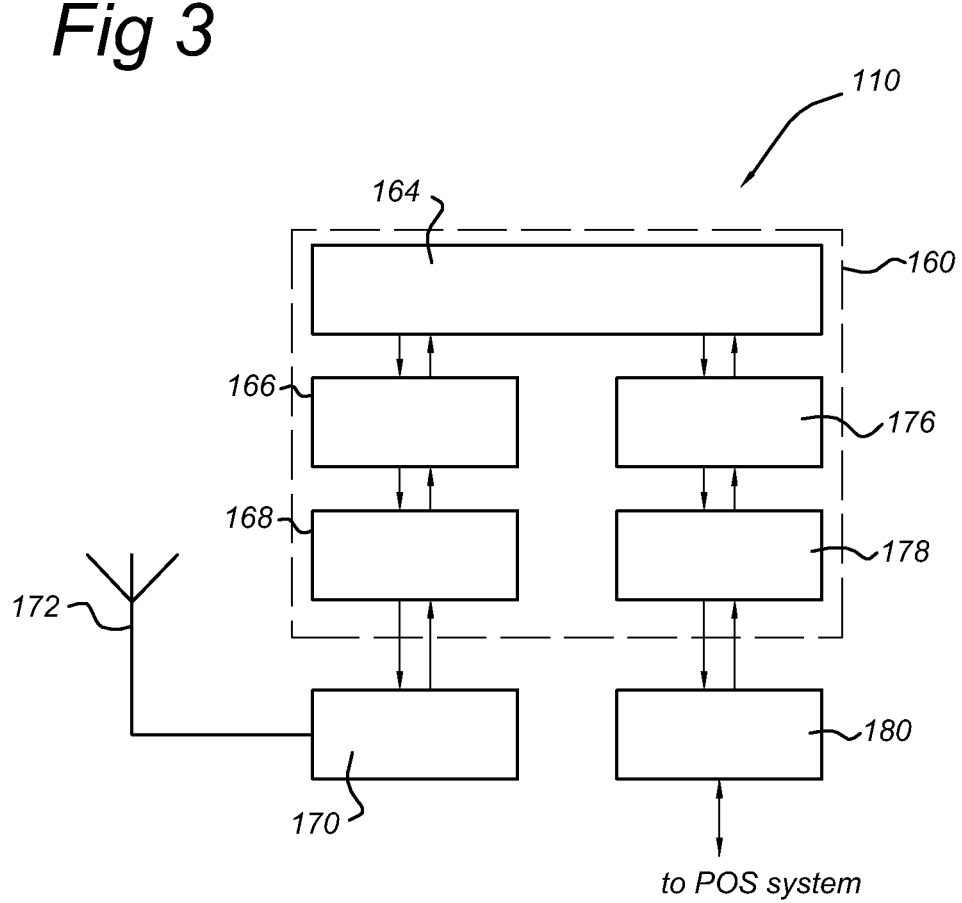
FIG. 3 shows a detailed block diagram of a network coordinator (having a radio with an antenna, another wired/wireless interface and a processor)

FIG. 3 shows a detailed block diagram of a network coordinator 110 that has a radio transceiver 170 with one or more antennae 172, a second wired/wireless communication interface 180 and a processor 160. The network coordinator 110 is during normal operation always turned on and uses a supply power such as provided by a mains power supply. The main parts of network coordinator 110 are implemented as building blocks inside processor 160. One of these building blocks is an 802.15.4 coordinator 166, which contains an ESL routing table that contains the information for routing the data packets from the POS system to the right electronic label and from the electronic label to the POS system. The 802.15.4 coordinator 166 is connected to an 802.15.4 driver 168 which is connected to radio transceiver 170. The 802.15.4 driver 168 provides a conversion layer between the application layer processing made in the 802.15.4 coordinator 166 and the PHY and MAC layer hardware of radio transceiver 170. The coordinator 166 is connected to a gateway function 164 that is connected to a protocol stack 176 for wired/wireless based communication towards the POS system. The gateway function 164 provides the conversion between the communication protocols used in the two parts of the ESL network, which are the 802.15.4 part and the wired/wireless part to the POS system. This last part is in a preferred embodiment based on IP based networking in contrast to the 802.15.4 part. The protocol stack 176 is connected to a communication driver 178 which is connected to the second communication interface 180, which is for example based on USB. The protocol stack 176 provides a conversion layer between the gateway function 164 and the processing in communication driver 178. Communication interface 180 comprises the PHY and MAC hardware.

The main function of the network coordinator is to listen for data request packets with the first communication interface using radio transceiver 170 and driver 168. Retrieve from each received data request packet the unique identification, which could be the MAC address of the electronic label. Retrieve the information associated with the unique identification of the electronic label to be transmitted to the electronic label. And transmitting the information in one or more data response packets.

FIG. 4 gives a flow-chart for CSMA-CA medium access with IEEE 802.15.4 non-beaconed networks. Before an 802.15.4 device can transmit a packet, it has to start the CSMA-CA process. In processing step S401 the device makes the NB counter for the number of already completed backoff cycles equal to 0 and it makes the BE counter for backoff exponent equal to aMacMinBE value as configured. Next, it waits during processing step S402 for a random number of backoff periods between 0 and ($2^{BE}-1$). The back period is a time unit equal to 320 µs according to IEEE 802.15.4. In the following processing step S403 it makes a Clear Channel Assessment (CCA). During processing step S404 it decides when the channel is idle. When the channel is idle the device will begin the transmission. When the channel is not idle, the device increases the counter value of NB for the number of backoffs with one and it increases the value of BE for the backoff exponent with one as long it has not reached it maximum equal to macMaxBE. After processing step S405 follows processing step S406 during which is decided if the number NB for backoffs has exceeded it maximum, macMaxCSMABackoffs. When this number NB has exceeded its maximum there is reported a channel access failure. If the maximum is not exceeded, there is returned to processing step S402 with waiting for a new random number of backoff periods between 0 and the new ($2^{BE}-1$).

The CSMA-CA scheme can be optimised by selecting the best values for its configurable parameters macMinBE, macMaxBE, macMaxCSMABackoff, aMaxFrameRetries in relation to the number of attempts allowed to access the medium and the spreading of attempts over time. The optimum selection depends on the traffic load, desired response and the allowed on-time with respect to power consumption constraints.

With a large ESL network the electronic labels can be configured for macMinBE, macMaxBE, macMaxCSMABackoff, aMaxFrameRetries with the values of respectively 8, 8, 3 and 3 to provide. The network coordinator is using a value for macMinBE of 0 that makes during the first iteration the collision avoidance will be disabled. Thus, when the network coordinator attempts to transmit a packet it will execute only a single CCA and only when the channel is idle it starts the transmission. When the network coordinator has to forward price information or non-update status to the electronic label in question, 802.15.4 coordinator 166 generates a data response packet at application level at a defined moment in time. Radio transceiver 170 will forward such data response packet with minimum delay. According to the invention the defined moment in time is a predetermined time interval after receipt of the begin of the data request packet or n times a predetermined time interval after the receipt of the begin of the data request packet.

FIG. 5 shows an example of the timing for transmissions between an electronic label #51 and the network coordinator. As described above, the electronic label 120#51 is waked-up after collecting sufficient energy by means of the solar cell and expiring a random time. Then, as illustrated in FIG. 5, electronic label 120#51 will attempt to send a data request packet to the network coordinator during interval I502 to request price update information and/or other information. For such a transmission attempt by the electronic label #51, the CSMA-CA scheme is passed, which scheme is based on among others a random backoff delay between 0 and the new ($2^8-1$) backoff periods (corresponding to 0-81.6 ms, based on macMinBE=macMaxBE=8) to provide sufficient spreading in time in case of channel activity. The electronic label #51 sends the data request packet during interval I502 after it finds the channel idle. The data request packet that is sent during interval I502, is followed by an acknowledge packet sent by network coordinator during interval 1522. During interval I504 the electronic label stays on to receive the acknowledge packet.

The electronic label #51 in question has been turned on shortly before the "expected" transmission of the data request packet to pass the CSMA-CA scheme and ramp-up its radio transceiver. To allow maximum sleep time for the electronic label it will turn its processor and radio transceiver to wake-up right in time for receipt of a data response packet sent by the network coordinator. Due to various other activities by the network coordinator and the POS system including accessing the right data for a certain electronic label and other communication over the wired or wireless connection between the network coordinator and POS system, the data response packet to be forwarded by the network coordinator to the electronic label in question can only follow after a significant unknown delay. For that purpose the network coordinator will attempt to send the data response packet after a predefined time interval or a multiple of this predefined time interval. This allows the electronic label #51 saving energy consumption because the waiting in receive mode can be minimized. The timing of the transmission of data response packet by the network coordinator is based on the moment it generates the packet in 802.15.4 coordinator 166 and it is forwarded with minimum delay by radio transceiver 170. The moment of generation is shortly before the start of the transmission of data response packet as indicated by vertical dashed line T519. Radio transceiver 170 has been synchronized with the start-of-frame delimiter symbol in the data request packet as indicated by vertical dashed line T517. Vertical (dashed) lines T518 and T519 indicate the moment of synchronization one and two predefined time intervals later. During time interval I506 electronic label 120#51 turns on its radio transceiver 132 and processor 134 to get ready for reception of a data response packet. As depicted in FIG. 5 the absence of a data response packet makes the electronic label decides after a short interval from the moment that the data response packet could be expected, to turn off its radio transceiver and processor. Because the expected data response packet with a matching address has not been arrived within a certain time window, the electronic label will turn off its radio transceiver and processor. Next, the electronic label reactivates close to the end of the second predefined time interval to be ready in time to receive the actual transmitted data response packet during interval 1524. After the reception of a data response packet during interval I508, the electronic label returns an acknowledge packet during interval I510 to the network coordinator.

The 802.15.4 coordinator 166 of a network coordinator 110 controls the timing with regard to transmission to a certain electronic label after expiring one or a number of times a predefined time interval, while the 802.15.4 radio transceiver executes a single CCA (macMinBE=0) and starts the transmission when the channel is idle. Therefore, some correction for the timing of transmission is built in 802.15.4 coordinator 166. Further, the electronic label has to build in some margin for the wake up moment and waiting window for the data response packet in relation to timing inaccuracies introduced by different system clock frequencies resulting differing length of the predefined time interval. An offset between timers can be up to 80 ppm with respect to the time expired since the data request packet has been sent.

During time interval I506 the electronic label has turned on its radio transceiver to receive a data response packet. This interval starts the predefined time interval after beginning sending the data request packet in time interval I502. FIG. 5 shows that the network coordinator does not sent a data request packet for the electronic label #51 starting at T518. Perhaps the network coordinator attempted to access the channel, but it could not transmit since another electronic label was transmitting a data request packet. Another possibility could be the transmission by the network coordinator of a data response packet for another electronic label followed by an acknowledge packet from said other electronic label that occupied the transmission channel.

At time instant T519, which is two predefined time intervals after beginning sending the data request packet of electronic label #51 at T517, the transmission channel has been found free by the network coordinator. Consequently, the network coordinator transmits the data response packet during time interval I524 to the electronic label #51. Electronic label #51 was at time T519 already looking for the data request packet in time interval I508 and transmits in response on receipt of the data response packet an acknowledge packet in time interval I510. The acknowledge packet informs the network coordinator of the correct receipt of the data response packet and if not receive correctly, the network coordinator will try to transmit again the data response packet at a time instant which is three times the predefined time interval after beginning sending the data request packet at T517.

For the 802.15.4 protocol, the period for transmitting of a data request packet is about 1 ms, 0.3 ms for an acknowledge packet that is preceded by a 0.1 ms inter packet period and 4 or 1 ms for a data response packet depending on a price update or no update situation respectively. In an embodiment, the predefined fixed time interval is 1 second. In this embodiment, the minimum time usage of the transmission channel is about 5.8 ms for requesting and transmitting the price update information. The total time period for these operations is large, at least 1 second, which is very long in comparison with the 5.8 ms channel usage.

FIG. 6 shows an example of the timing for transmissions between a number of electronic labels, i.e. three and a network coordinator. Likewise as in FIG. 5, electronic label #61 sends a data request packet during interval I602 to the network coordinator which returns after the predefined time interval a data response packet during 1624 interval. The electronic labels #61, #62 and #63 have been synchronized with the start-of-frame delimiter symbol in the data request packet as indicated by vertical dashed lines T617, T618 and T619 respectively. Vertical (dashed) line T620 indicates the moment of synchronization for electronic label #61 one predefined time interval later. Vertical (dashed) lines T621 and T623 indicates the moment of synchronization for electronic label #62 one and two predefined time interval later. Vertical (dashed) line T622 indicates the moment of synchronization for electronic label #63 one predefined time interval later. FIG. 6 shows for electronic label #62 a situation as shown in FIG. 5 wherein the electronic label looks for a data request packet and no data response packet is transmitted by the network coordinator. In period I624, the coordinator is busy with the transmission of data response packet towards electronic label #61, while electronic label #62 is waiting here in vain during interval 1636. The numbers I632 through I654 relate to electronic label #62 and are aligned with the numbers I502 through I524 in FIG. 5 for electronic label #51.

The situation for electronic label #63 is illustrated by the numbers I662 through I684, these look more or less the same as with electronic label #61 illustrated by numbers I602 through I624. Here again as in FIG. 5 the time scaling for the different type of time intervals is not conform reality and is chosen for the sake of illustrative purposes only.

FIG. 6 shows, that the electronic labels #61, #62 and #63 which request for a price update in the corresponding order, retrieve their price data in the following order #61, #63 and #62.

In another embodiment, electronic label 120 is provided with a sensor unit 131 inside power supply manager 128 as described with FIG. 2. Before electronic label 120 sends a data request packet the processor 134 will make request to the sensor unit 131 to determine by means of voltage quantization the voltage range as indication for the energy buffered in energy storage 126 at that moment. The actual buffered energy in energy storage 126 allows the electronic label 120 for a number of attempts to access the channel and to the send the data request packet together with a number of attempts to receive the expected data response packet after expiration of the predefined time interval and to retrieve and process the data in a data response packet. The electronic label will consume energy to send the data request packet (which takes consumption for the processor and for the radio transceiver with radio turn-on sequence, making the CSMA-CA, actual radio transmission, receiving acknowledge packet) and to receive the data response packet (which takes consumption for the processor and for the radio transceiver with radio turn-on sequence, actual radio reception, transmission of acknowledge packet) and to update the display. In case the data response packet is not transmitted after one or more predefined time intervals the electronic label needs to have sufficient energy stored to allow a later reception of the data response packet.

Because the electronic label wakes up after a predefined time interval and turns on its radio to receive, it will only continue to operate to receive the full data response packet when it gets a packet with its own MAC address as destination within a certain time window. When the electronic label does not receive a packet with the right MAC address within the certain time window, then it returns quickly to sleep mode to save energy and will wake up after the next predefined time interval. Although the electronic label consumes during such short wake-up for the certain time window much less than with the (price update) data response packet reception, the turn-on and-off action will reduce the residual energy stored. Therefore, in an embodiment of the invention, the electronic label provides energy status information by means of a parameter in the data request packet to the network coordinator.

In an embodiment, the parameter indicates the number of regular time instants the electronic label will look for a data response packet after transmitting the data request packet. This is then an indication for the network coordinator to determine whether it is possible, if necessary, to delay for one or more predefined time intervals while the electronic label is still capable to receive the data response packet after such a delay. This allows the network coordinator to schedule the transmission of data response packet such that only packets will be transmitted that are expected to be received by the corresponding electronic label, and to avoid unnecessary medium utilization to the sake of better network performance and response behaviour. Thus in accordance to the parameter, the network coordinator will not transmit the data response packet for a particular electronic label after a number of predefined time intervals defined by the parameter.

In a further embodiment, the network coordinator uses such energy status indication to (re)schedule data response packets based on a priority scheme with respect to electronic labels having a lower energy status. In this way, a data response packet to an electronic label with a lower energy status is prioritized at the cost of electronic labels with a higher energy status. This feature leads to a better overall network behaviour that allows more reliable operation with respect to the lower energy electronic labels.

In another embodiment of the present invention, the energy status indication parameter informs the network coordinator that it is able to receive a data response packet with price update information or not able to receive at all a data response packet because very limited energy buffered. In this way the electronic label can inform the network coordinator that it is still 'alive' but it is not able to receive any information from the network coordinator. At a later moment in time such an electronic label can have collected enough energy and can forward a better energy status that refers to the ability to receive a data response packet. This feature gives a more graceful system degradation at which the electronic labels with very low energy can still be monitored from the POS terminal as being present.

In another embodiment of the present invention, the energy status indication parameter forwarded to the network coordinator indicates the number of times the electronic label can wake up for a short data response packet without price update information and/or the number of times the electronic label can wake up for a long data response packet with price update information. The network coordinator uses the energy status indication to estimate the number of times the transmittal of a data response packet can be delayed. Every time, a predetermined time interval has expired and no data response packet is transmitted, the value corresponding to the energy status indication is decreased with one. When there are coinciding expected windows for transmitting a data response packet to different electronic labels, the network coordinator will transmit the data response packet to the electronic label with the lowest value for the energy status, i.e. the minimal possibility to delay transmittal of the data response packet. As the needed power to receive a short data response packet, i.e. packet without price update information, is less than the power needed to receive a long data response packet, i.e. packet with price update information, two different parameters could be used to indicate the maximum allowable delay to transmit the corresponding data response packet. However, in another embodiment, only one parameter value is transmitted, representative for maximum delay for transmitting a data response packet without price up-date information. For this case, the decrease of delay for transmitting a data response packet with price update information has to be known. Then after receipt of a data response packet, the network coordinator will first determine what type of data response packet has to be sent to the electronic label and will subtract a predetermined value from the received energy status indication value. Here, again the energy status indication value stored in a memory in the network coordinator for the electronic label in question has to be updated for the time intervals already exceeded to predict the ability of the electronic label to receive either a short or long data response packet.

In another embodiment, sensor unit 131 of electronic label 120 is provided with an electric current quantisation provision (not depicted in FIG. 2) to measure the current from solar cell block 124 to energy storage 126. Before electronic label 120 sends a data request packet the processor 134 will make a request to the electric current quantisation provision to determine an indication for current at that moment or for the average current during some interval. The indication of such current reflects the light conditions for solar cell block 124. Next, electronic label sends in the data request packet a parameter as indication for the electric current to the network coordinator indicating the energy status of the node with respect to energy harvesting conditions. Then, the network coordinator can forward this parameter as indication for the electric current generated by the solar cells and the corresponding light conditions, to the POS system to allow diagnostics in relation to light conditions for the electronic labels. Furthermore, a parameter indicating the current in combination with the buffered energy, could be used to estimate more accurately the possibilities of the node to receive the data response packet. This estimation could be performed by the node or by the network coordinator. In the latter case, a data request packet comprises two parameters, one indicating the voltage, i.e. buffered energy, and one indicating the electric charge current, i.e. energy harvesting conditions.

FIG. 7 shows an example of timing for transmissions between a number of electronic labels and the network coordinator gives different priorities for transmission towards the electronic labels. Likewise as in FIG. 6 here a situation is given with three electronic labels, in FIG. 7 the electronic labels have numbers #71, #72 and #73. The electronic labels #71, #72 and #73 have been synchronized with the start-of-frame delimiter symbol in the data request packet as indicated by vertical dashed lines T717, T718 and T719 respectively. Vertical (dashed) lines T720 and T723 indicate the moment of synchronization for electronic label #71 one and two predefined time intervals later. Vertical (dashed) line T721 indicates the moment of synchronization for electronic label #72 one predefined time interval later. Vertical (dashed) lines T722 and T724 indicate the moment of synchronization for electronic label #73 one and two predefined time intervals later. Further, a likewise numbering is used for the transmission of data request packets during intervals I702, I732 and I762 and for the transmission of data response packets during intervals I724, I754 and I784. However, the scheduling for data response packet during interval 1724 by the network coordinator has been postponed a predefined time interval due to the data request packet from electronic label #72 that is transmitted during interval I732 and the information contained in this data request packet is pointing to a lower energy status for electronic label #72 than the one indicated the data request packet sent by electronic label #71. The network coordinator determines that the transmission window I724a of data request packet for electronic label #71 will coincide the transmission window I754 of data request packet for electronic label #72. Therefore, the scheduling of data response packet for electronic label #71 has been postponed for an extra predefined time interval. The scheduling of the data response packet for electronic label #72 stays unchanged after the network coordinator has received a data response packet from electronic label #73. The energy status for electronic label 120#73 allows an extra turning on cycle, thus after the next predefined time interval the electronic label 120#73 can receive its data response packet during interval I768.

From FIGS. 6 and 7 can be seen that scheduling by means of priorities does not necessarily extend the time window for transmitting all data to the devices. However, scheduling allows the system to improve the reliability of updating the devices. If electronic label #62 in FIG. 6 was not able to receive the data response packet with one delay electronic label #62 would not receive the price update as shown in FIG. 6. Then, electronic label #62 should harvest enough energy before it could send again a data request packet. This waiting extends the time for updating all devices in the network. The scheduling based on energy status, allows to submit first to electronic label #72, and then to electronic labels #71 and #73 respectively, which period is equivalent in case the devices had enough energy to receive a data response packet with one or more delays over the predetermined time interval.

In another embodiment of the present invention the sensor unit 131 provides information to processor 134 on the voltage of charged storage capacitor in energy storage 126 pointing to the presence of a voltage level that is above 3.1 V and above 3.5 V. With a voltage level of 3.1 V the electronic label has stored energy in the capacitor to allow a current consumption of 220 µAs before the voltage will dropped below 2.0 V. The voltage level of 2.0 V is assumed as the minimum for electronic label operation. With at least 3.5 V, the current consumption will be 300 µAs based on storage capacitor value of 200 µF. (Note: calculation in µJ would complicate things since capacitor energy is based on $E=\frac{1}{2} C*V^2$.) In this way the electronic label can point to one out of two possible energy status indication values that corresponds to availability to respectively between 220 µAs and 300 µAs or to more than 300 µAs. In an embodiment, a transmission of the data request packet (including one CCA and including acknowledge packet reception) takes 50 µAs, an extra CCA check takes 10 µAs, a wake up without reception of a matching MAC address takes 40 µAs and a reception of (price update) data response packet (including acknowledge packet transmission) takes 150 µAs. When the data request packet transmission is scheduled and the energy status values refers to between 220 and 300 µAs, the data request packet transmission (with up to two extra CCAs) takes up to 70 µAs and with the first possibility to receive the data response packet the electronic label will have energy for at least 150 µAs to allow the reception of a data response packet with price update information. When the electronic label gives an energy status indication value for more than 300 µAs, there will be least a capability for 230 µAs with the first occasion to receive the data response packet, which is 80 µAs more. Thus, the network coordinator can schedule for the data response packet towards the electronic label in question with a possibility to postpone the transmission one or two time the predefined time interval, i.e. 2 times 40 µAs. It should be noted that in this embodiment, the electronic label will only send a data request packet when the voltage level is above 3.1 V. Otherwise, a third value, indicating that the energy status does not allow a current consumption of 220 µAs before the voltage drops below 2.0 V. This will inform the network coordinator that the electronic label is still alive but not capable of receiving a data response packet. If the network coordinator receives such an indication, the network coordinator will not transmit a data response packet in response of the receipt of a data request packet. This reduces the amount of data transmitted to devices which could not receive the data, resulting in unnecessary transmission channel usage.

In another embodiment of the present invention the data request packet that is transmitted by an electronic label, has in the Frame control field (of the MAC header) no active bit for an acknowledge packet. This would save radio on-time (and medium utilisation) and leave more energy for the electronic label to receive a data response packet. In another embodiment of the present invention the data response packet that is transmitted by the network coordinator, has in the Frame control field (of the MAC header) no active bit for an acknowledge packet. This would save radio on-time (and medium utilisation) and would imply less energy reservation for the electronic label.

However, the usage of an acknowledge packet request and waiting the acknowledge packet allows for the electronic label a rescheduling of its data request packet and implies more robustness. Thus, the usage of acknowledge packet relates to design trade-offs in relation to the metric of network performance/individual response time/robustness (against interference).

In another embodiment of the present invention the sensor unit 131 provides information to processor 134 on the voltage of charged storage capacitor in energy storage 126 and is pointing to three or more different energy levels. Herewith, the network coordinator can schedule based on a more extended priority scheme. For example indicating a possible maximum delay of transmission of a data response packet by one, two, three, four, five or even more times.

In another embodiment of the present invention the network coordinator can send a short data response packet to an electronic label to point to a later scheduling of the data response packet with respect to priority of packets for other electronic label and/or delayed data response. This could be advantageous for electronic labels having sufficient energy available. By indicating the expected delay in terms of number of predefined time intervals, the corresponding electronic labels does not have to switch on its processor and transceiver after each predefined time interval, but only at the moment it is expected that the network coordinator will transmit the data response packet. This will save energy in the electronic label and a possibility to extend the maximum delay time for transmitting the data response packet comprising the price update information. In this embodiment, the network coordinator is arranged to transmit a data response packet comprising a delay parameter indicating the delay for receiving the data response packet and the electronic label is arranged to retrieve the delay parameter and to wake up for receiving the data response packet after a number of predefined time intervals indicated by the delay parameter.

In another embodiment of the present invention, the electronic label transmits a data request packet comprising a time interval parameter indication the duration of the predefined time interval. This allows a system with more differentiation between electronic labels depending on energy status indication and or energy harvesting conditions.

In another embodiment of the present invention the network coordinator sends immediately after the acknowledge packet that follows a data request packet, a time interval packet with a dedicated predefined time interval for the electronic label in question. In this embodiment the network coordinator is arranged to generate such a time interval packet and the electronic label is arranged to receive the time interval packet and to set a timer to enable the electronic label to wake-up after expiration of the dedicated predefined time interval or a multiple thereof.

In another embodiment of the present invention, the information to be transmitted to the electronic label is to much for one data response packet. The network coordinator is aware of such situation and could take this into account with respect to the maximum allowable delay for sending all the information, and scheduling the transmission of the data response packet such that chance of receipt of all data is maximized. In this embodiment, the data response packet comprises a more data parameter indicating that more data is available for transmission to the electronic label. As an example the network coordinator could include in the data response packet a more data parameter value indication that the network coordinator schedules a subsequent data response packet after the next predefined time interval. After receipt of such a more data parameter value, the electronic label will wake-up after the predefined time interval to receive the subsequent data response packet. As another example the network coordinator includes a more data parameter value in the data response packet indicating that a subsequent data response packet will be transmitted after receipt of a new data request packet from the electronic label in question. This more data parameter is advantageous because of one or more of following reasons:

the electronic label has according expectation not enough energy to receive the next data response packet after the next predefined time interval, the transmission channel has for the time window around the next predefined time interval already relative high expected occupation and/or there is already scheduled a data response packet to another electronic label around the time the next data response packet for the first electronic label should be transmitted.

In this case, the electronic label will transmit a subsequent data request packet after a defined period. The defined period for transmitting a next data request packet is preferably smaller than when a more data parameter value indicating that a subsequent data response packet will be transmitted after receipt of a new data request packet is not received.

The present invention is disclosed by means of an ESL system as example. The invention is not limited to such a system but could be used for any network system comprising a multitude of end node devices communication with one network coordinator, wherein the system uses a CSMA protocol and is based on a star type network operating in non-beaconed mode. In a star network, an end node device is sometimes named "spoke" node.

An improved protocol and scheduler is disclosed allowing very low power operation for the electronic labels with maximum sleep time for radio and processor. The very low power operation allows using a solar cell based power supply provision with a small area for stacked solar cell elements to power the electronic shelf label, even with low or poor indoor lighting conditions. Furthermore, the present invention provides a system behaviour that gives robustness, self-recovery and graceful degradation in relation to radio interference, varied load conditions and changing energy harvesting conditions, i.e. light intensity levels.

Several embodiments of the present invention have been described above by way of exemplary embodiments. Various modifications and variations for the elements described with respect to these embodiments may be made by the skilled person without departing from the scope of the present invention, which is defined by the appended claims.

The invention claimed is:

1. A node comprising:
   a transceiver provided for communication with a network coordinator, wherein the transceiver handles a transmission channel based on CSMA;
   a processing unit provided for processing data received via the transmission channel; and
   wherein the node is arranged to perform sending recurrently a data request packet,
   going to a low power mode after sending the data request packet, and
   waking-up for receiving a data response packet a predefined time interval after beginning sending the data request packet;
   wherein the node comprises a network address and data packets comprises a destination address, wherein the node is further arranged to perform:
   deriving the destination address from a data packet;
   going to lower power mode when the destination address differs from the network address; and,
   waking-up for receiving the data response packet at regular time instants, wherein the interval between the regular time instants corresponds to the predefined time interval.

2. The node according to claim 1, wherein the node further comprises:
   a power supply unit comprising an energy storage and a solar cell; and
   a sensor for determining the energy status of the energy storage and the node is further arranged to perform
   transmitting a data request packet comprising one or more parameters indicating the energy status of the node.

3. The node according to claim 2, wherein the parameter indicates the number of regular time instants the node will look for the data response packet after transmitting the data request packet.

4. The node according to claim 2, wherein the parameter indicates at least one of: voltage across or energy capacity region of the energy storage or electric charge current of the energy storage.

5. The node according to claim 1, wherein the node transmits a data request packet comprises a time interval parameter indicating the duration of the predefined time interval.

6. The node according to claim 1, wherein the time interval between two subsequent transmissions of a data request packet is at least y times the predefined time interval, y being an integer greater than 4.

7. The node according to claim 6, wherein the time interval for transmitting a next data request packet depends on the moment of receiving the data response packet.

8. The node according to claim 7, wherein the data response packet comprises a no-data-available parameter indicating that there is no data for the node, wherein the time interval for transmitting a next data request packet depends further on the no-data-available parameter, wherein the time interval for sending a next data request packet is smaller when the no-data-available parameter indicates that there is no data for the node than when the data-response packet comprises data.

9. The node according to claim 8, wherein the time interval between two subsequent transmissions of the data request packet is variable and comprises a fixed part and a stochastic part.

10. The node according to claim 1, wherein the node is an electronic label comprising a display unit for displaying data received from a data response packet.

11. The node according to claim 1, wherein the data response packet comprises a more data parameter indicating that more data is available for transmission to the node, the node being arranged to perform corresponding actions in response to said more data parameter.

12. A system including a network coordinator for communication with a multitude of node, and a node of the multitude of node,
the network coordinator comprising:
a transceiver provided for communication with the node, wherein the transceiver handles a transmission channel based on CSMA;
a processing unit provided for processing data received via the transmission channel and acquiring data to be transmitted to the node by means of a data response packet; and
wherein the network coordinator is arranged to perform
receiving a data request packet sent by the node,
preparing a data response packet comprising instructions to be transmitted to the node, and
transmitting the data response packet a predefined time interval after receiving the beginning of the data request packet;
the node comprising:
a transceiver provided for communication with the network coordinator, wherein the transceiver handles a transmission channel based on CSMA;
a processing unit provided for processing data received via the transmission channel; and
wherein the node is arranged to perform
sending recurrently a data request packet,
going to a low power mode after sending the data request packet, and
waking-up for receiving a data response packet a predefined time interval after beginning sending the data request packet;
wherein the node comprises a network address and data packets comprises a destination address, wherein the node is further arranged to perform:
deriving the destination address from a data packet;
going to lower power mode when the destination address differs from the network address; and,
waking-up for receiving the data response packet at regular time instants, wherein the interval between the regular time instants corresponds to the predefined time interval.

13. The system according to claim 12, wherein the network coordinator is further arranged to perform recurrently:
check for an acknowledge packet transmitted by the electronic label immediately after transmitting the data response packet; and optionally
if the acknowledge packet is not detected, transmitting again the data response packet the predefined time interval after beginning sending the previous data response packet.

14. The system according to claim 12, wherein the network coordinator is arranged to retrieve from the data request packet a parameter indicating the energy status of the node and to operate accordingly.

15. The system according to claim 14, wherein the parameter indicates the number of regular time instants the node will look for the data response packet after transmitting the data request packet and the network coordinator is arranged to transmit the data response packet recurrently according the parameter if an acknowledge packet is not received from the node.

16. The system according to claim 12, wherein the data request packet comprises a time interval parameter indicating the duration of the predefined time interval, and the network coordinator is arranged to transmit the data response packet said predefined time interval after receiving the beginning of the data request packet.

17. The system according to claim 12, wherein the network coordinator is arranged to delay the transmission of a data response packet for a first node at least one predefined time interval if the transmission of a data response packet for a second node would coincide the transmission of the data response packet of the first node and the energy status of the first node is better than the energy status of the second node or if the transmission medium is busy.

18. The system according to claim 17, wherein the network coordinator comprises a memory for storing for an node a value indication the number of recurrent time instants to receive a data response packet wherein the value has a relationship with the energy status, wherein the network coordinator is arranged to adapt recurrently the value stored in the memory when the predefined time interval has passed.

19. The system according to claim 12, wherein the network coordinator is arranged to include in the data response packet a more data parameter indicating that more data is available for transmission to the node.

* * * * *